United States Patent
Matsumoto et al.

[11] Patent Number: 6,152,969
[45] Date of Patent: Nov. 28, 2000

[54] ANTHRAPYRIDONE COMPOUNDS, WATER-BASED INK COMPOSITION, AND ARTICLES COLORED THEREWITH

[75] Inventors: Hiroyuki Matsumoto; Yasuo Shirasaki; Katsunori Fujii, all of Saitama, Japan

[73] Assignee: Nippon Kayaku Kabushiki Kaisha, Tokyo, Japan

[21] Appl. No.: 09/230,902

[22] PCT Filed: Sep. 11, 1997

[86] PCT No.: PCT/JP97/03204

§ 371 Date: Feb. 3, 1999

§ 102(e) Date: Feb. 3, 1999

[87] PCT Pub. No.: WO98/11167

PCT Pub. Date: Mar. 19, 1998

[30] Foreign Application Priority Data

| Sep. 11, 1996 | [JP] | Japan | 8-261193 |
| Oct. 16, 1996 | [JP] | Japan | 8-293185 |
| Mar. 6, 1997 | [JP] | Japan | 9-067504 |

[51] Int. Cl.$^7$ .......................... C09B 44/00; C07D 221/18
[52] U.S. Cl. ........................ 8/658; 8/657; 546/76; 106/22 H
[58] Field of Search .............. 546/76; 106/23 H; 8/657, 658; 347/100

[56] References Cited

U.S. PATENT DOCUMENTS

| 4,169,203 | 9/1979 | Wingard et al. ............ 546/76 |
| 4,446,470 | 5/1984 | Sugiyama et al. . |
| 4,740,581 | 4/1988 | Pruett et al. . |
| 5,300,418 | 4/1994 | Visconte et al. . |
| 5,372,864 | 12/1994 | Weaver et al. . |

FOREIGN PATENT DOCUMENTS

| 0658804 | 6/1995 | European Pat. Off. . |
| 53-66936 | 6/1978 | Japan . |
| 57-195775 | 12/1982 | Japan . |
| 57-197191 | 12/1982 | Japan . |
| 59-74173 | 4/1984 | Japan . |
| 2-16171 | 1/1990 | Japan . |

OTHER PUBLICATIONS

Copy of the International Search Report dated Dec. 9, 1997.

*Primary Examiner*—John Kight
*Assistant Examiner*—Binta Robinson
*Attorney, Agent, or Firm*—Nields & Lemack

[57] ABSTRACT

The present invention relates to the development of a coloring matter which has a moderately bluish magenta color and an excellent lightfastness and can provide a wide range of color tones in the visible range when used together with yellow and cyan inks. A water-base ink composition or the like is prepared by using a sulfonic acid derivative of an anthrapyridone compound represented by general formula (I) as a magenta dye, wherein $R_1'$ represents alkoxycarbonyl, carbonyl or benzoyl; $R_2$ represents hydrogen or alkyl; and $R_3$ and $R_4$ represent each independently hydrogen, halogeno, alkyl or alkoxy.

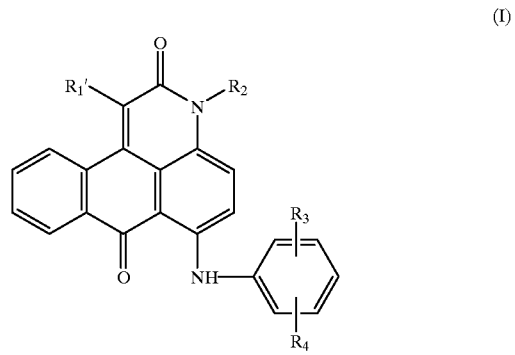

(I)

10 Claims, No Drawings

ANTHRAPYRIDONE COMPOUNDS, WATER-BASED INK COMPOSITION, AND ARTICLES COLORED THEREWITH

This application is a §371 of PCT/JP97/03204 filed on Sep. 11, 1997.

TECHNICAL FIELD

The present invention relates to an anthrapyridone compound or a salt thereof, an ink composition and an article colored.

BACKGROUND ART

Diverse ink jetting processes have been developed for the recording method by means of inkjet printer as the representative ones of various color recording methods, and any of the processes comprises generating an ink droplet to deposit the droplet onto various recording materials (paper, film, cloth, etc.) for recording. The recording method has rapidly been spread in recent years owing to such characteristic properties that the method is noiseless due to no noise generation because of no contact between the recording head and the recording material and that the printer therefor can readily be downsized and can be prepared into a high-speed machine with ready coloring potency, and accordingly, the method will increasingly be propagated in future. An image information or a character information is generally recorded in color on a computer color display by means of an inkjet printer according to subtractive color mixing of inks of four colors, namely yellow, magenta, cyan and black. So as to reproduce an image by additive color mixing of R, G and B on a CRT display or the like as an image by subtractive color mixing at a fidelity as high as possible, the color tone and vividness of the dyes to be used therefor are technically significant issues. Additionally, it is required that the resulting ink composition is stable for long-term storage and that the resulting printed image is at a high optical density and with excellent fastness including water resistance and light fastness. If such ink composition is utilized for exhibitions such as advertisements so as to enlarge the applicable field thereof in near future, the resulting image is more frequently exposed to light (electric light, fluorescent lamp, sunlight, etc.). Thus, an ink composition with high light fastness is essentially demanded. So as to satisfy these demands, various methods have been proposed (for example, Japanese Patent Publication Nos. 49543/1995 and 4794/1994, Japanese Patent Laid-open No. 228447/1994 and Japanese Patent Publication No. 79109/1993).

Among dyes for use in inks for inkjet color printers, magenta has such drawbacks that magenta dyes with a color tone suitable for diversified blend colors and with vividness are at a lower light fastness resistant level, while magenta dyes at a high light fastness level are unsatisfactory for preparing diversified blend colors and further lack vividness.

DISCLOSURE OF THE INVENTION

It is an object of the present invention to provide a magenta dyes for use in color recording primarily including inkjet printing, characteristically having a color tone and vividness suitable for diversified blend colors and preparing thereby recorded matters at high light fastness, whereby hard copies at a fidelity as high as possible to an original on a color display can be produced.

The present inventors have made investigations so as to overcome the problems described above. Consequently, the present invention has been achieved. More specifically, the present invention relates to those described below.

(1) A sulfonic acid derivative of an anthrapyridone compound represented by the formula (I);

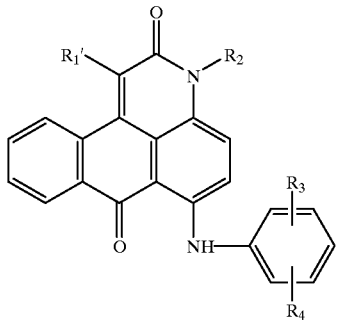

wherein $R_1'$ represents alkoxycarbonyl group, carboxyl group or benzoyl group; $R_2$ represents hydrogen atom or alkyl group.; $R_3$ and $R_4$ independently represent hydrogen atom, halogen atom, alkyl group or alkoxyl group (except for the combination that $R_1'$ represents ethoxycarbonyl group; $R_2$ represents methyl group; $R_3$ represents hydrogen atom; $R_4$ represents chlorine atom at position 4 while sulfonate group is at position 2).

(2) An anthrapyridone compound represented by the formula (II);

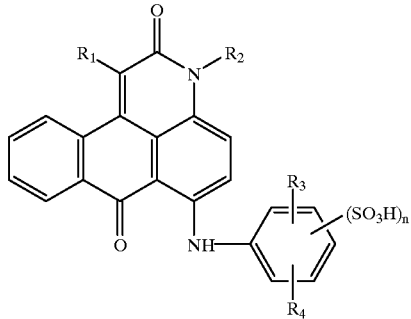

wherein $R_1$ represents alkoxycarbonyl group, carboxyl group, benzoyl group or 3-sulfobenzoyl group; $R_2$ represents hydrogen atom or alkyl group; $R_3$ and $R_4$ independently represent hydrogen atom, halogen atom, alkyl group or alkoxyl group; n represents an integer of 0 through 3, except for the combination (a) that n is 0 and $R_1$ represents alkoxycarbonyl group; and the combination (b) that n is 1 and $R_1$ represents ethoxycarbonyl group; $R_2$ represents methyl group; $R_3$ represents hydrogen atom; $R_4$ represents chlorine atom at position 4 while sulfonate group is at position 2, or a salt thereof.

(3) An anthrapyridone compound described above in (2), wherein $R_1$ represents alkoxycarbonyl group, carboxyl group, benzoyl group or 3-sulfobenzoyl group; $R_2$ represents hydrogen atom or methyl group; $R_3$ represents hydrogen atom, methyl group or chlorine atom bound to position 3 and $R_4$ represents hydrogen atom; n represents an integer 1 or 2 and sulfonate group is bound at position 4 or sulfonate groups are bound at positions 4 and 6, or a salt thereof.

(4) An anthrapyridone compound described above in (2), wherein $R_1$ represents alkoxycarbonyl group; n is 2; and sulfonate groups are bound at positions 4 and 6, or a salt thereof.

(5) An anthrapyridone compound described above in (2), wherein $R_1$ represents alkoxycarbonyl group; $R_2$ represents hydrogen atom or methyl group; $R_3$ represents hydrogen atom or methyl group bound at position 3; and $R_4$ represents hydrogen atom; n is 2; and sulfonate groups are bound at positions 4 and 6, or a salt thereof.

(6) A compound represented by the formula (III);

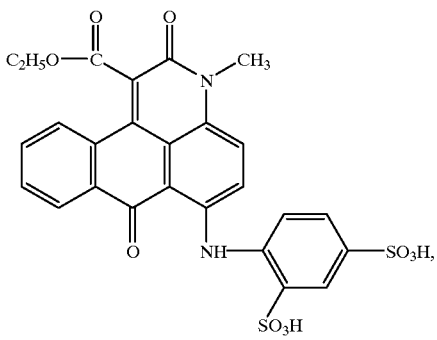

(III)

or a salt thereof.

(7) A compound represented by the formula (IV);

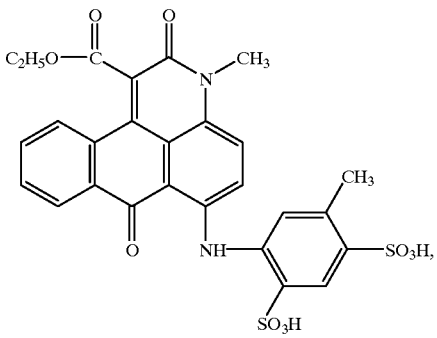

(IV)

or a salt thereof.

(8) An anthrapyridone compound represented by the formula (V);

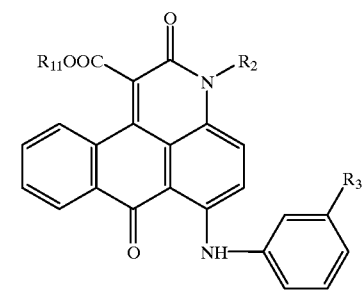

(V)

wherein $R_{11}$ represents alkyl group; $R_2$ represents hydrogen atom or alkyl group; $R_3$ represents hydrogen atom, halogen atom, alkyl group or alkoxyl group, except for the case that $R_2$ is methyl group and $R_3$ is hydrogen atom provided that $R_{11}$ is methyl group and the case that $R_2$ is 2-ethylhexyl group and $R_3$ is hydrogen atom provided that $R_{11}$ is ethyl group, or a salt thereof.

(9) A water-base ink composition containing an anthrapyridone compound or a salt thereof, as described above in any one of (1) to (8).

(10) A colored article having been colored with an anthrapyridone compound or a salt thereof, as described above in any one of (1) to (8).

(11) A colored article described in (10), having been colored with a printer.

BRIEF DESCRIPTION OF THE DRAWINGS

FIG. 1 depicts chromaticity diagram expressing the color ranges with trichromatic colors, wherein solid line expresses the chromaticity diagram of various blend colors obtained by using the ink composition of Example 10 and dotted line expresses the chromaticity diagram of blend colors obtained by using the ink composition of Comparative Example 3; and FIG. 2 depicts chromaticity diagram expressing the color ranges with trichromatic colors, wherein solid line expresses the chromaticity diagram of various blend colors obtained by using the ink composition of Example 11 and dotted line expresses the chromaticity diagram of blend colors obtained by using the ink composition of Comparative Example 3.

In FIGS. 1 and 2, the axis X represents a* on the L*a*b * colorimetric system and the axis Y represents b* thereon (on the L*a*b* system, a* represents red direction; −a* represents green direction; and b* represents yellow direction; and −b* represents blue direction).

BEST MODE FOR CARRYING OUT THE INVENTION $R_1'$ in the formula (I) mentioned above represents alkoxycarbonyl group, carboxyl group or benzoyl group; $R_1$ in the formula (II) (2) mentioned above represents alkoxycarbonyl group, carboxyl group, benzoyl group or 3-sulfobenzoyl group. Specific examples of the alkoxycarbonyl group as $R_1'$ and $R_1$ include C1–C6 alkoxycarbonyl groups, such as methoxycarbonyl group, ethoxycarbonyl group, n-propoxycarbonyl group, isopropoxycarbonyl group, n-butoxycarbonyl group, isobutoxycarbonyl group and t-butoxycarbonyl group.

In the formulas (I) and (II) mentioned above, $R_2$ is hydrogen atom or alkyl group. Specific examples of the alkyl group as $R_2$ include C1–C10 alkyl groups, such as methyl group, ethyl group, n-propyl group, isopropyl group, n-butyl group, isobutyl group, t-butyl group, pentyl group, hexyl group, heptyl group, octyl group, nonyl group and decyl group.

In the formulas (I) and (II) mentioned above, $R_3$ and $R_4$ independently represent hydrogen atom, halogen atom, alkyl group or alkoxyl group. Specific examples of possible halogen atom include fluorine atom, chlorine atom, bromine atom and iodine atom. Similarly, specific examples of such alkyl group include C1–C4 alkyl groups, such as methyl group, ethyl group, n-propyl group, isopropyl group, n-butyl group, isobutyl group and t-butyl group. Furthermore, specific examples of the alkoxyl group include C1–C6 alkoxyl groups such as methoxy group, ethoxy group, n-propoxy group, isopropoxy group, n-butoxy group, isobutoxy group, and t-butoxy group. $R_3$ and $R_4$ are bound to position 2 or 3 and 3 or 4, respectively, when the imino group is bound at position 1. In the formula (II) mentioned above, n is an integer of 0 to 3. When n is an integer of 1 to 3, the sulfonic acid group is bound at any position 2, 4 or 6 when the imino group is bound at position 1.

In the formulas (I) and (II) mentioned above, a preferable combination of $R_{1'}$ or $R_1$, $R_2$, $R_3$, $R_4$ and n in the formula (II) is for example such that $R_{1'}$ or $R_1$ is alkoxycarbonyl group, carboxyl group, benzoyl group or 3-sulfobenzoyl group; $R_2$ is hydrogen atom or methyl group; $R_3$ is hydrogen atom, methyl group or chlorine atom bound at position 3; $R_4$ is hydrogen atom and n is an integer 1 or 2, wherein sulfonate group is bound at position 4 or sulfonate groups are bound at positions 4 and 6. A more preferable combination is such that $R_{1'}$ or $R_1$ is alkoxycarbonyl group; $R_2$ is hydrogen atom or methyl group; $R_3$ is hydrogen atom or methyl group bound at position 3; $R_4$ is hydrogen atom and n is 2, wherein sulfonate groups are bound at positions 4 and 6. A still more preferable combination is such that $R_{1'}$ or $R_1$ is ethoxycarbonyl group; $R_2$ is methyl group; $R_3$ is hydrogen atom or methyl group bound at position 3; $R_4$ is hydrogen atom and n is 2, wherein sulfonate groups are bound at positions 4 and 6.

In accordance with the present invention, the sulfonic acid derivative of the anthrapyridone compound represented by the formula (I) mentioned above means a compound obtained by sulfonating the anthrapyridone compound represented by the formula (I) mentioned above, and the sulfonic acid group may be free or in the form of a salt, satisfactorily. The salt of the sulfonic acid derivative of the anthrapyridone compound represented by the formula (II) mentioned above is the salt thereof at the sulfonic acid group. The salt of the sulfonic acid derivative (specifically, the compound represented by the formula (II) mentioned above) of the anthrapyridone compound represented by the formula (I) mentioned above includes for example alkali metal salts, for example sodium salt, potassium salt and lithium salt, ammonium salt, salts with various amines. Specific examples of various amines include C1–C4 alkanolamines, for example monomethanolamine, dimethanolamine, trimethanolamine, monoethanolamine, diethanolamine, triethanolamine, monopropanolamine, dipropanolamine, and tripropanolamine.

So as to obtain the individual salts of the sulfonic acid derivative of the anthrapyridone compound represented by the formula (I) mentioned above, for example, the crystal of the resulting sodium salt is dissolved in water, followed by addition of an acid to adjust the resulting solution to acidity, and then, if necessary, the cake obtained which is sometimes obtained by filtration is again dissolved in water, to which is added potassium hydroxide, lithium hydroxide, aqueous ammonia, or an alkanol amine such as diethanol amine or triethanol amine, to prepare the potassium salt, the lithium salt, the ammonium salt, the alkanol amine salt such as diethanol amine salt or triethanol amine salt.

Specific examples of the compound represented by the formula (I) or (II) mentioned above are shown below.

TABLE 1

| Comp. No. | $R_1$ or $R_1{}'$ | $R_2$ | $R_3$ | $R_4$ (position) | n (position) | Salt |
|---|---|---|---|---|---|---|
| 01 | —COOC2H5 | —CH3 | H | H | 0 | |
| 21 | —COOC2H5 | —CH3 | H | H | 2(4,6-) | Na |
| 02 | —COOC2H5 | —CH3 | H | —CH3(3-) | 0 | |
| 22 | —COOC2H5 | —CH3 | H | —CH3(3-) | 2(4,6-) | Na |
| 03 | —COOC2H5 | H | H | —CH3(3-) | 0 | |
| 23 | —COOC2H5 | H | H | —CH3(3-) | 2(4,6-) | Na |
| 04 | —COOC2H5 | H | H | H | 0 | |
| 24 | —COOC2H5 | H | H | H | 2(4,6-) | Na |
| 34 | —COOH | H | H | H | 2(4,6-) | Na |
| 05 | —COPh | H | H | —CH3(3-) | 0 | |
| 25 | —COPh | H | H | —CH3(3-) | 2(4,6-) | Na |
| 35 | -3S-BENZOYL | H | H | —CH3(3-) | 2(4,6-) | Na |
| 06 | —COPh | —CH3 | H | H | 0 | |
| 26 | —COPh | —CH3 | H | H | 2(2,4-) | Na |
| 36 | -3S-BENZOYL | —CH3 | H | H | 2(2,4-) | Na |
| 07 | —COPh | H | H | H | 0 | |
| 27 | —COPh | H | H | H | 2(2,4-) | Na |
| 37 | -3S-BENZOYL | H | H | H | 2(2,4-) | Na |
| 08 | —COPh | —CH3 | H | —CH3(3-) | 0 | |
| 28 | —COPh | —CH3 | H | —CH3(3-) | 2(4,6-) | Na |
| 31 | —COOH | —CH3 | H | H | 2(4,6-) | Na |
| 09 | —COOC2H5 | —CH3 | H | —CH3(4-) | 0 | |
| 29 | —COOC2H5 | —CH3 | H | —CH3(4-) | 1(2-) | Na |
| 010 | —COOC2H5 | —CH3 | H | —CH3(2-) | 0 | |
| 210 | —COOC2H5 | —CH3 | H | —CH3(2-) | 1(4-) | Na |
| 011 | —COOC2H5 | —CH3 | H | —Cl(3-) | 0 | |
| 211 | —COOC2H5 | —CH3 | H | —Cl(3-) | 2(4,6-) | Na |
| 012 | —COOCH3 | —CH3 | H | H | 0 | |
| 212 | —COOCH3 | —CH3 | H | H | 2(2,4-) | Na |
| 013 | —COOC2H5 | —CH3 | H | —OCH3(4-) | 0 | |
| 213 | —COOC2H5 | —CH3 | H | —OCH3(4-) | 1(2-) | Na |
| 014 | —COOC2H5 | —CH3 | H | —OCH3(2-) | 0 | |
| 214 | —COOC2H5 | —CH3 | H | —OCH3(2-) | 1(4-) | Na |
| 015 | —COOC2H5 | —CH3 | —CH3(2-) | —CH3(6-) | 0 | |
| 215 | —COOC2H5 | —CH3 | —CH3(2-) | —CH3(6-) | 1(4-) | Na |
| 016 | —COOC2H5 | —CH3 | H | —C4H9(4-) | 0 | |
| 216 | —COOC2H5 | —CH3 | H | —C4H9(4-) | 1(2-) | Na |
| 017 | —COOC2H5 | —C2H5 | H | H | 0 | |

TABLE 1-continued

| Comp. No. | R₁ or R₁' | R₂ | R₃ | R₄ (position) | n (position) | Salt |
|---|---|---|---|---|---|---|
| 217 | —COOC2H5 | —C2H5 | H | H | 2(2,4-) | Na |
| 018 | —COOC2H5 | —C4H9 | H | H | 0 | |
| 218 | —COOC2H5 | —C4H9 | H | H | 2(2,4-) | Na |
| 019 | —COOC2H5 | H | H | —CH3(4-) | 0 | |
| 219 | —COOC2H5 | H | H | —CH3(4-) | 1(2-) | Na |
| 319 | —COOC2H5 | H | H | —CH3(4-) | 2(2,6-) | Na |
| 020 | —COOC2H5 | H | H | —CH3(2-) | 0 | |
| 220 | —COOC2H5 | H | H | —CH3(2-) | 1(4-) | Na |
| 021 | —COOC2H5 | H | H | —Cl(3-) | 0 | |
| 221 | —COOC2H5 | H | H | —Cl(3-) | 2(4,6-) | Na |
| 022 | —COOC2H5 | H | H | —Cl(4-) | 0 | |
| 222 | —COOC2H5 | H | H | —Cl(4-) | 1(2-) | Na |
| 023 | —COOC2H5 | H | H | —OCH3(4-) | 0 | |
| 223 | —COOC2H5 | H | H | —OCH3(4-) | 1(2-) | Na |
| 024 | —COOC2H5 | H | H | —CH3(2-) | 0 | |
| 224 | —COOC2H5 | H | H | —CH3(2-) | 1(4-) | Na |
| 025 | —COOC2H5 | H | H | —C4H9-n(4-) | 0 | |
| 225 | —COOC2H5 | H | H | —C4H9-n(4-) | 1(2-) | Na |
| 026 | —COOCH3 | H | H | H | 0 | |
| 226 | —COOCH3 | H | H | H | 2(2,4-) | Na |
| 027 | —COOC4H9 | H | H | H | 0 | |
| 227 | —COOC4H9 | H | H | H | 2(2,4-) | Na |
| 028 | —COPh | —CH3 | H | —CH3(4-) | 0 | |
| 228 | —COPh | —CH3 | H | —CH3(4-) | 1(2-) | Na |
| 029 | —COPh | —CH3 | H | —CH3(2-) | 0 | |
| 229 | —COPh | —CH3 | H | —CH3(2-) | 2(4,6-) | Na |
| 030 | —COPh | —CH3 | H | —Cl(3-) | 0 | |
| 230 | —COPh | —CH3 | H | —Cl(3-) | 2(4,6-) | Na |
| 031 | —COPh | —CH3 | H | —Cl(4-) | 0 | |
| 231 | —COPh | —CH3 | H | —Cl(4-) | 1(2-) | Na |
| 032 | —COPh | —CH3 | H | —OCH3(4-) | 0 | |
| 232 | —COPh | —CH3 | H | —OCH3(4-) | 1(2-) | Na |
| 033 | —COPh | —CH3 | H | —OCH3(2-) | 0 | |
| 233 | —COPh | —CH3 | H | —OCH3(2-) | 1(4-) | Na |
| 034 | —COPh | —CH3 | —CH3(2-) | —CH3(6-) | 0 | |
| 234 | —COPh | —CH3 | —CH3(2-) | —CH3(6-) | 1(4-) | Na |
| 035 | —COPh | —CH3 | H | —C4H9-n(4-) | 0 | |
| 235 | —COPh | —CH3 | H | —C4H9-n(4-) | 1(2-) | Na |
| 036 | —COPh | —C2H5 | H | H | 0 | |
| 236 | —COPh | —C2H5 | H | H | 2(2,4-) | Na |
| 037 | —COPh | —C4H9 | H | H | 0 | |
| 237 | —COPh | —C4H9 | H | H | 2(2,4-) | Na |
| 038 | —COPh | H | H | —CH3(4-) | 0 | |
| 238 | —COPh | H | H | —CH3(4-) | 1(2-) | Na |
| 039 | —COPh | H | H | —CH3(2-) | 0 | |
| 239 | —COPh | H | H | —CH3(2-) | 2(2,4-) | Na |
| 040 | —COPh | H | H | —Cl(3-) | 0 | |
| 240 | —COPh | H | H | —Cl(3-) | 2(4,6-) | Na |
| 041 | —COPh | H | H | —Cl(4-) | 0 | |
| 241 | —COPh | H | H | —Cl(4-) | 1(2-) | Na |
| 042 | —COPh | H | H | —OCH3(4-) | 0 | |
| 242 | —COPh | H | H | —OCH3(4-) | 1(2-) | Na |
| 043 | —COPh | H | H | —OCH3(2-) | 0 | |
| 243 | —COPh | H | H | —OCH3(2-) | 1(4-) | Na |
| 044 | —COPh | H | —CH3(2-) | —CH3(6-) | 0 | |
| 244 | —COPh | H | —CH3(2-) | —CH3(6-) | 1(4-) | Na |
| 045 | —COPh | H | H | —C4H9-n(4-) | 0 | |
| 245 | —COPh | H | H | —C4H9-n(4-) | 1(2-) | Na |
| 046 | —COOC2H5 | —C2H5 | H | H | 0 | |
| 246 | —COOC2H5 | —C2H5 | H | H | 2(4,6-) | Na |
| 047 | —COOC2H5 | —C3H7-n | H | H | 0 | |
| 247 | —COOC2H5 | —C3H7-n | H | H | 2(4,6-) | Na |
| 048 | —COOC2H5 | —C4H9-n | H | H | 0 | |
| 248 | —COOC2H5 | —C4H9-n | H | H | 2(4,6-) | Na |
| 049 | —COOC2H5 | —CH(CH3)C2H5 | H | H | 0 | |
| 249 | —COOC2H5 | —CH(CH3)C2H5 | H | H | 2(4,6-) | Na |
| 050 | —COOC2H5 | —C(CH3)3 | H | H | 0 | |
| 250 | —COOC2H5 | —C(CH3)3 | H | H | 2(4,6-) | Na |
| 051 | —COOC2H5 | —C6H13-n | H | H | 0 | |
| 251 | —COOC2H5 | —C6H13-n | H | H | 2(4,6-) | Na |
| 052 | —COOC2H5 | —C8H17-n | H | H | 0 | |
| 252 | —COOC2H5 | —C8H17-n | H | H | 2(4,6-) | Na |
| 053 | —COOC2H5 | -2EH | H | H | 0 | |
| 253 | —COOC2H5 | -2EH | H | H | 2(4,6-) | Na |
| 054 | —COOC2H5 | -2EH | H | —CH3(3-) | 0 | |
| 254 | —COOC2H5 | -2EH | H | —CH3(3-) | 2(4,6-) | Na |

TABLE 1-continued

| Comp. No. | $R_1$ or $R_1'$ | $R_2$ | $R_3$ | $R_4$ (position) | n (position) | Salt |
|---|---|---|---|---|---|---|
| 055 | —COOC2H5 | —C10H21-n | H | H | 0 | |
| 255 | —COOC2H5 | —C10H21-n | H | H | 2(4,6-) | Na |

(Note) In the table, 'Ph' represents phenyl group; additionally, compounds with Nos. starting 0, such as Compounds of Nos. 01 to 09 and 010 to 055 are raw materials (intermediate materials) for producing the compounds of the present invention. '2EH' represents 2-ethylhexyl group (—CH$_2$CH(C$_2$H$_5$)C$_4$H$_{9-n}$); '3S-BENZOYL' represents 3-sulfobenzoyl group; and '-n' represents linear chain.

Among these compounds, the sulfonic acid derivatives of the compounds with $R_1$ being —COOC$_2$H$_5$ are preferable; the sulfonic acid derivative of the compound No. 0 1 or 02 is more preferable, which specifically includes the compounds of Nos.21 and 22.

The compound of the present invention can be prepared by subjecting for example a compound represented by the general formula (VI);

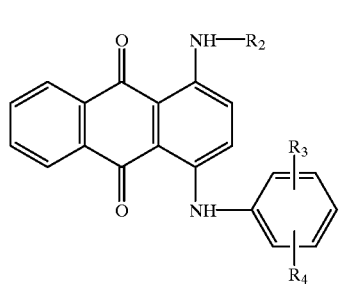

(VI)

(wherein $R_2$, $R_3$ and $R_4$ represent the same as described above) and a compound represented by the general formula (VII);

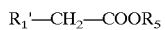

$R_1'$—CH$_2$—COOR$_5$ (VII)

(wherein $R_1'$ represents the same as described above; and $R_5$ represents alkyl group) together to a reaction, to obtain the compound of the formula (I), and then sulfonating the resulting compound to obtain the sulfonic acid derivative of the compound of the formula (I) (specifically, a compound of the formula (II) wherein n is 1 to 3).

The reaction of the compound of the general formula (VI) with the compound of the general formula (VII) is satisfactorily facilitated in a solvent such as orthodichlorobenzene, monochlorobenzene, nitrobenzene and xylene in the presence of, as a catalyst, a base such as sodium carbonate, potassium carbonate, sodium acetate and potassium acetate at a reaction temperature of 100 to 200° C. for a reaction period of 3 to 30 hours. After the completion of the reaction, the reaction product is cooled and diluted with a solvent such as methanol, ethanol and propanol, and filtered and is then rinsed in alcohols such as methanol, ethanol and propanol, if necessary, and is additionally rinsed in warm water and is then dried, to obtain the compound represented by the formula (I).

The sulfonation of the compound represented by the formula (I) mentioned above as a raw material is effected in sulfuric acid containing fuming sulfuric acid. The concentration of fuming sulfuric acid in sulfuric acid is preferably at 2 to 20% by weight, more preferably at 5 to 15% by weight, and still more preferably at 7 to 12% by weight. The reaction temperature is generally 0 to 100° C., preferably 10 to 50° C. Further, the reaction time varies depending on the reaction temperature, but generally, the reaction time is 5 minutes to 20 hours, and about 15 minutes to 5 hours in an preferable embodiment. After the completion of the reaction, the reaction solution is poured in an ice-water, followed by salting, filtration and drying, to obtain the sulfonic acid derivative (specifically, a compound of the general formula (II) wherein n is 1 to 3) of the compound of the formula (I).

Examples of the compound represented by the general formula (VI) for use in producing the compound of the present invention are as follows.

TABLE 2

| Compound No. | $R_2$ | $R_3$ (position) | $R_4$ (position) |
|---|---|---|---|
| 2-1 | —CH3 | H | H |
| 2-2 | —CH3 | H | —CH3(3-) |
| 2-3 | —CH3 | H | —CH3(4-) |
| 2-4 | —CH3 | —CH3(2-) | H |
| 2-5 | —CH3 | H | —Cl(3-) |
| 2-6 | —CH3 | H | —Cl(4-) |
| 2-7 | —CH3 | H | —OCH3(4-) |
| 2-8 | —CH3 | —OCH3(2-) | H |
| 2-9 | —CH3 | —CH3(2-) | —CH3(6-) |
| 2-10 | —CH3 | H | —C4H9-n(4-) |
| 2-11 | —C2H5 | H | H |
| 2-12 | —C4H9-n | H | H |
| 2-13 | H | H | H |
| 2-14 | H | H | —CH3(3-) |
| 2-15 | H | —CH3(2-) | H |
| 2-16 | H | H | —Cl(3-) |
| 2-17 | H | H | —Cl(4-) |
| 2-18 | H | H | —OCH3(4-) |
| 2-19 | H | —OCH3(2-) | R |
| 2-20 | H | —CH3(2-) | —CH3(6-) |
| 2-21 | H | H | —C4H9-n(4-) |
| 2-22 | —CH(CH3)C2H5 | H | H |
| 2-23 | —C(CH3)3 | H | H |
| 2-24 | —C6H13-n | H | H |
| 2-25 | —C8H17-n | H | H |
| 2-26 | —CH2CH(C2H5)C4H9-n | H | H |
| 2-27 | —C10H21-n | H | H |

(Note) In the table, '-n' represents linear chain.

Examples of the compound represented by the general formula (VII) for use in producing the compound of the present invention are as follows.

TABLE 3

| Compound No. | $R_1'$ | $R_5$ |
|---|---|---|
| 3-1 | —COOC2H5 | —C2H5 |
| 3-2 | —COOCH3 | —CH3 |
| 3-3 | —COOC4H9-n | —C4H9 |
| 3-4 | —COPh | —C2H5 |
| 3-5 | —COPh | —CH3 |

(Note) In the table, 'Ph' represents phenyl group.

Additionally, the compound of the present invention can be synthetically produced as follows. More specifically, an anthrapyridone compound with bromine atom at position 4 of the anthraquinone backbone can be obtained through a first reaction of 1-alkylamino-4-bromo-anthraquinone or 1-amino-4-bromo-anthraquinone with malonate dialkyl ester or benzoylacetate alkyl ester, and through a subsequent concentration reaction of the resulting compound with anilines such as aniline, m-toluidine, and p-toluidine, the compound of the general formula (I) can be obtained. By subsequently sulfonating the resulting compound in a similar manner, the sulfonic acid derivative (specifically, a compound represented by the general formula (II)) of the compound of the general formula (I) in accordance with the present invention can be obtained.

The process can be depicted in a reaction scheme as follows.

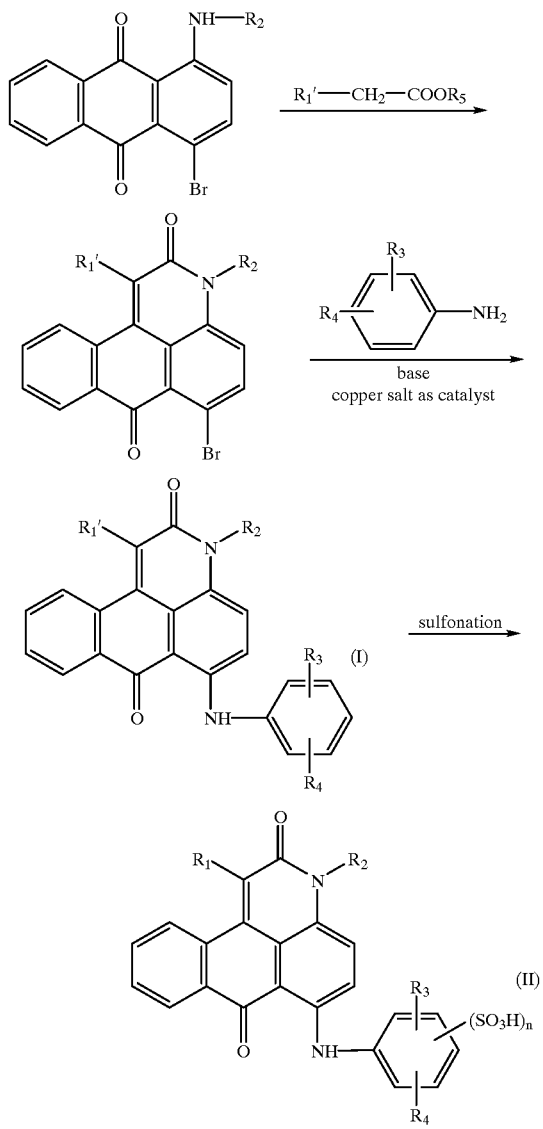

The water-base ink composition of the present invention is prepared by dissolving the sulfonic acid derivative (specifically, for example, a compound of the general formula (II)) of the compound of the general formula (I) (referred to as the inventive dye hereinafter) in water or an aqueous solvent (water containing such a water-soluble organic solvent as described below). For using the water-base ink composition as an ink for inkjet printer, preferably, the inventive dye is at a lower content of inorganic matters such as the chlorides and sulfates of metal cations, which content is for example about 1% by weight or less. So as to produce the inventive dye with less inorganic matters, for example, the inventive dye is subjected to desalting treatment by conventional methods, such as a method by means of reverse osmotic membrane.

The water-base ink composition of the present invention is prepared in water as a medium, and the inventive dye is contained preferably at 0.1 to 20% by weight, more preferably at 1 to 10% by weight and still more preferably at 2 to 8% by weight in the water-base ink composition. The water-base ink composition of the present invention additionally may contain a water-soluble organic solvent at 0 to 30% by weight and an ink preparing agent at 0 to 5% by weight.

The ink composition of the present invention is prepared, by adding the inventive dye and the water-soluble organic solvent and, if necessary, the ink preparing agent if necessary to water such as distilled water with no impurities contained therein and mixing them together. Alternatively, the inventive dye may satisfactorily be added to and dissolved in a mixture of water, the water-soluble organic solvent mentioned above and the ink preparing agent. The resulting ink composition may be subjected to filtration, if necessary, to remove the contaminants from the composition.

Specific examples of the water-soluble organic solvent to be possibly used include for example C1–C4 alkanols such as methanol, ethanol, propanol, isopropanol, butanol, isobutanol, secondary butanol and tertiary butanol; carboxylate amides such as N,N-dimethylformamide and N,N-dimethylacetoamide; lactams such as ε-caprolactam and N-methylpyrrolidin-2-one; urea; cyclic ureas such as 1,3-dimetylimidazolidin-2-one or 1,3-dimethylhexahydropyrimid-2-one; ketones or keto-alcohols such as acetone, methyl ethyl ketone, and 2-methyl-2-hydroxypentan-4-one; ethers such as tetrahydrofuran and dioxane; mono-, oligo- or poly-alkylene glycol or thioglycol having C2–C6 alkylene units, such as ethylene glycol, 1,2- or 1,3-propyelene glycol, 1,2- or 1,4-butylene glycol, 1,6-hexylene glycol, diethylene glycol, triethylene glycol, dipropylene glycol, thiodiglycol, polyethylene glycol and polypropylene glycol; polyols (triols) such as glycerin and hexane-1,2,6-triol; C1–C4 alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; γ-butyrolactone; or dimethylsulfoxide.

Among these water-soluble organic solvents, preference is given to N-methylpyrrolidin-2-one and mono-, di- or tri-alkylene glycol with a C2–C6 alkylene unit and particularly to mono-, di- or triethylene glycol, dipropylene glycol, and dimethylsulfoxide etc. Specifically, N-methylpyrrolidin-2-one, diethylene glycol and dimethylsulfoxide are preferable.

The ink preparing agent includes for example preservatives and antimold agents, pH adjusting agents, chelating agents, rust preventives, water-soluble ultraviolet absorbing agents, water-soluble polymeric compounds, dye dissolving agents, non-drying oils, and surfactants. The preservatives and antimold agents include for example dehydroacetate soda, sorbate soda, sodium 2-pyridinethiol-1-oxide, sodium benzoate and sodium pentachlorophenol. The pH adjusting agents include any substance that can control the ink pH within a range of 8.0 to 11.0 with no adverse effect on the ink preparation. Such examples include alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The chelating reagents include for example sodium ethylenediaminetetraacetate, sodium nitrilotriacetate, sodium hydroxylethylenediaminetriacetate, sodium diethylenetriaminepentaaceate, and sodium uramil diacetate. The rust preventives include for example acidic hyposulfite salts, sodiumthiosulfate, ammoniumthioglycolate, diisopropylammonium nitrite, tetranitrate pentaerythritol, and dicyclohexylammonium nitrite. The non-drying oils include for example glycerin.

The colored articles of the present invention is produced by coloring with the inventive dye. Articles to be colored are with no specific limitation, specifically including for example paper, fiber and cloth (cloths made of nylon, wool, etc.), leather, base materials for color filter and the like. The coloring method includes for example exhaust dyeing method, textile printing method, printing methods such as screen printing, and methods with inkjet printers, and the methods with inkjet printers is preferable.

The compound of the present invention is in an appropriately bluish magenta color, having excellent light fastness and can prepare a color tone in a wide, visible range in combination with a yellow ink and a cyan ink. The inventive dye is useful as a coloring matter for preparing recording ink compositions for inkjet recording and writing materials or as a coloring matter for dyeing or coloring various matters to be dyed or colored.

EXAMPLES

The present invention will now be described more specifically with reference to examples. Further, "part" and "%" hereinbelow mean the part and % on a weight basis, unless otherwise stated.

Example 1—1

(1) 24.6 parts of 1-methylamino-4-anilinoanthraquinone, 0.75 part of sodium carbonate, 30.0 parts of diethyl malonate, and 75 parts of orthodichlorobenzene are charged in a reactor, which are then heated to 170 to 175° C. for 10-hr reaction. The reaction is promoted while purging generated ethanol and water from the reaction system. After confirming the completion of the reaction by HPLC (high-performance liquid chromatography), the reaction solution is cooled, followed by addition of 150 parts of methanol and agitation for one hour, and the resulting mixture is filtered and rinsed in 100 parts of methanol and subsequently in 300 parts of warm water and is then dried, whereby Compound No.01 is obtained in purple red crystal at a yield of 25.2 parts. m. p. 221° C.

(2) Subsequently, 26.0 parts of 96% sulfuric acid is charged in a reactor, followed by addition of 36.2 parts of 30% fuming sulfuric acid thereto under cooling with ice, to prepare 10% fuming sulfuric acid. Under cooling with ice, then, 8.5 parts of the Compound No.01 are added thereto below 20° C., and after elevating the temperature to 40 to 45° C., sulfonation is promoted at the temperature for 3 hours. The resulting reaction solution is added to 400 parts of icy water, followed by addition 30 parts of sodium chloride under agitation for salting and subsequent 2-hr agitation and filtration, and the resulting product is dried, whereby the sodium salt (composed of 10.3 parts of Compound No.21 and 1.7 parts of Compound No.31) of the sulfonic acid derivative of the Compound No.01 of the present invention is obtained in red powder at a yield of 12.0 parts. The $\lambda$max of the sodium salt is 527 nm (in an aqueous solution).

(3) The sodium salt of the sulfonic acid derivative of the Compound No.01, thus obtained above, is dissolved in water, followed by addition of an acid to adjust the solution to acidity, which is then filtered to obtain a cake. The cake is then dissolved again in water, followed by addition of potassium hydroxide, lithium hydroxide, aqueous ammonia, diethanolamine or triethanolamine, whereby a compound in the form of potassium salt, lithium salt, ammonium salt, diethanolamine salt or triethanolamine salt is obtained, respectively, instead of the sodium salt of the sulfonic acid derivative of the Compound No.01.

Example 1–2

In the same manner as in Example 1—1, except that the sulfonation is carried out at a temperature of 15 to 20° C. for 4 hours, instead of a temperature of 40 to 45° C. for 3 hours in Example 1—1, the sodium salt (composed of 12.1 parts of Compound No.21 and 0.2 part of Compound No.31) of the sulfonic acid derivative of the Compound No.01 was obtained in red powder at a yield of 12.3 parts. The $\lambda$max of the sodium salt is 528 nm (in an aqueous solution). m.p. 211° C.

Example 2

25.7 parts of 1-methylamino-4-(3-methyl-anilino) anthraquinone, 0.75 part of sodium carbonate, 30.0 parts of diethyl malonate, and 45 parts of orthodichlorobenzene are charged in a reactor, which are then heated to 175 to 180° C. for 5-hr reaction. The reaction is promoted while purging generated ethanol and water from the reaction system. After confirming the completion of the reaction by HPLC, the reaction solution is cooled in water, followed by addition of 135 parts of methanol and agitation under cooling in ice for one hour, and the resulting deposited crystal is filtered and rinsed in 180 parts of methanol and subsequently in 180 parts of warm water and is then dried, whereby Compound No.02 is obtained in purple red crystal at a yield of 26.3 parts.

Subsequently, 31.0 parts of 96% sulfuric acid is charged in a reactor, followed by addition of 33.4 parts of 30% fuming sulfuric acid thereto under cooling in ice, to prepare 7% fuming sulfuric acid. Under cooling in ice, then, 8.8 parts of the Compound No.02 are added thereto below 20° C., and then, sulfonation is promoted at a temperature of 20 to 25° C. for 3 hours. The resulting reaction solution is added to 400 parts of icy water, followed by addition 60 parts of sodium chloride under agitation for salting and subsequent 2-hr agitation and filtration, and the resulting product is dried, whereby the sodium salt of the Compound No.22 (the inventive dye) is obtained in red powder at a yield of 12.2 parts. The $\lambda$max of the Compound is 533 nm (in an aqueous solution).

The Compound No.22 thus obtained above is dissolved in water, followed by addition of an acid to adjust the solution to acidity, which is then filtered to obtain a cake. The cake is then dissolved again in water, followed by addition of potassium hydroxide, lithium hydroxide, aqueous ammonia, diethanolamine or triethanolamine, whereby a compound in the form of potassium salt, lithium salt, ammonium salt, diethanolamine salt or triethanolamine salt is obtained, respectively, instead of the sodium salt of the Compound No.22.

Example 3

24.6 parts of 1-amino-4-(3-methyl-anilino)anthraquinone, 0.75 part of sodium carbonate, 30.0 parts of diethyl malonate, and 75 parts of orthodichlorobenzene are charged in a reactor, which are then heated to 160 to 170° C. for 2-hr reaction. The reaction is promoted while purging generated ethanol and water from the reaction system. The reaction solution is cooled in water, followed by addition of 150 parts of methanol and agitation for 2 hours and subsequent filtration, and the resulting matter is rinsed in 100 parts of methanol and subsequently in 300 parts of warm water and is then dried, whereby Compound No.03 is obtained in red crystal at a yield of 25.3 parts.

Subsequently, 31.0 parts of 96% sulfuric acid is charged in a reactor, followed by addition of 33.4 parts of 30% fuming sulfuric acid thereto under cooling in ice, to prepare 7% fuming sulfuric acid. Under cooling in ice, then, 8.5 parts of the Compound No.03 are added thereto below 20° C., and then, sulfonation is promoted at a temperature of 40 to 45° C. for 1 hour. The resulting reaction solution is added to 400 parts of icy water, followed by addition of 200 parts of an aqueous 25% caustic soda solution by dropwise under agitation to prepare the solution to weak alkalinity and subsequent addition of 100 parts of sodium chloride for salting and thereafter 2-hr agitation and heating under agitation at 60 to 65° C. for 1 hr, and the resulting product is filtered and dried, whereby the sodium salt of the Compound No.23 (inventive dye) is obtained in red powder at a yield of 11.0 parts. The $\lambda$max of the sodium salt is 534 nm (in an aqueous solution).

The Compound No.23 thus obtained above is dissolved in water, followed by addition of an acid to adjust the solution to acidity, which is then filtered to obtain a cake. The cake is then dissolved again in water, followed by addition of potassium hydroxide, lithium hydroxide, aqueous ammonia, diethanolamine or triethanolamine, whereby a compound in the form of potassium salt, lithium salt, ammonium salt, diethanolamine salt or triethanolamine salt is obtained, respectively, instead of the sodium salt of the Compound No.23.

Example 4

23.6 parts of 1-amino-4-anilinoanthraquinone, 0.75 part of sodium carbonate, 30.0 parts of diethyl malonate ester, and 75 parts of orthodichlorobenzene are charged in a reactor, which are then heated to160to 170° C. for2-hr reaction. The reaction is promoted while purging generated methanol and water from the reaction system. The reaction solution is cooled in water, followed by addition of 150 parts of methanol and agitation for 1 hour and subsequent filtration, and the resulting matter is rinsed in 100 parts of methanol and subsequently in 300 parts of warm water and is then dried, whereby Compound No.04 is obtained in red crystal at a yield of 24.3 parts.

Subsequently, 26.0 parts of 96% sulfuric acid is charged in a reactor, followed by addition of 36.2 parts of 30% fuming sulfuric acid thereto under cooling in ice, to prepare 10% fuming sulfuric acid. Under cooling in ice, then, 8.5 parts of the Compound No.04 are added thereto below 20° C., and then, sulfonation is promoted at a temperature of 40 to 45° C. for 1 hour. The resulting reaction solution is added to 400 parts of icy water, followed by addition 100 parts of sodium chloride under agitation for salting, which is then agitated for 2 hours and is then heated at 60 to 65° C. under agitation for lhr, followed by filtration and drying, to obtain the sodium salt (composed of 6.7 parts of Compound No.24 and 5.0 parts of Compound No.34) of the sulfonic acid derivative of the Compound No.04 in red powder at a yield of 11.7 parts. The $\lambda$max of the sodium salt is 522 nm (in an aqueous solution).

The sodium salt of the sulfonic acid derivative of the Compound No.04 thus obtained is dissolved in water, followed by addition of an acid to adjust the solution to acidity, to obtain a cake, which is then dissolved in water again, followed by addition of potassium hydroxide, lithium hydroxide, aqueous ammonia, diethanolamine or triethanolamine, to obtain the potassium salt, lithium salt, ammonium salt, diethanolamine salt or triethanolamine salt of the Compound No.04,respectively, instead of the sodium salt of the sulfonic acid derivative of the Compound No.04.

Example 5-1

The same manner as in Example 1—1(1) was repeated, except for the use of 75 parts of monochlorobenzene instead of the use of orthodichlorobenzene in Example 1—1(1) and the reaction which was conducted at a reaction temperature of 130 to 135° C. for 20 hours while slowly passing nitrogen gas therethrough, the same compound as the Compound No.01 obtained in Example 1—1(1) is obtained in red crystal at a yield of 25.2 parts.

Example 5-2

The same manner as in Example 1—1(1) is repeated, except for the use of 1.2 parts of anhydrous sodium acetate instead of the use of 0.75 part of the sodium carbonate, the use of 112 parts of xylene in stead of the use of orthodichlorobenzene in Example 1—1(1) and the reaction which was conducted at a reaction temperature of 143 to 145° C. for 8 hours. The same compound as the Compound No.01 obtained in Example 1—1(1) is obtained in dark green crystal at a yield of 27.7 parts.

Example 6

24.6 parts of 1-amino-4-(3-methyl-anilino)anthraquinone, 0.75 part of sodium carbonate, 36.0 parts of ethyl benzoylacetate and 75 parts of orthodichlorobenzene are charged in a reactor, which are then heated to 170 to 175° C. for 3-hr reaction. The reaction is promoted while purging generated ethanol and water from the reaction system. After the completion of the reaction is confirmed by HPLC, the reaction solution is cooled in water, followed by addition of 150 parts of methanol to deposit crystal and subsequent agitation for 1 hour and filtration, and the resulting crystal is rinsed in 200 parts of methanol and subsequently in water and is then dried, whereby Compound No.05 is obtained in red crystal at a yield of 29.4 parts.

Subsequently, 31.0 parts of 96% sulfuric acid is charged in a reactor, followed by addition of 33.4 parts of 30% fuming sulfuric acid thereto under cooling in ice, to prepare 7% fuming sulfuric acid. Under cooling in ice, then, 9.1 parts of the Compound No.05 are added thereto below 20° C., and then, sulfonation is promoted at a temperature of 40 to 45° C. for 1 hour. The resulting reaction solution is added to 400 parts of icy water, followed by addition of 40 parts of sodium chloride for salting, which is then agitated for 2 hours and is then filtered and dried, to obtain the sodium salt (composed of 12.0 parts of Compound No.25 and 0.9 part of Compound No.35) of the sulfonic acid derivative of the Compound No.05 in red powder at a yield of 12.9 parts. The $\lambda$max of the sodium salt is 534 nm (in an aqueous solution).

The sodium salt of the sulfonic acid derivative of the Compound No.05 thus obtained is dissolved in water, followed by addition of an acid to adjust the solution to acidity, to obtain a cake, which is then dissolved in water again, followed by addition of potassium hydroxide, lithium hydroxide, aqueous ammonia, diethanolamine or triethanolamine, to obtain the potassium salt, lithium salt, ammonium salt, diethanolamine salt or triethanolamine salt of the Compound No.05,respectively, instead of the sodium salt of the sulfonic acid derivative of the Compound No.05.

Example 7

23.6 parts of 1-methylamino-4-anilinoanthraquinone, 0.75 part of sodium carbonate, 36.0 parts of ethyl benzoylacetate and 75 parts of orthodichlorobenzene are charged in a reactor, which are then heated to 170 to 170° C. for 3-hr reaction. The reaction is promoted while purging generated ethanol and water from the reaction system. After the completion of the reaction is confirmed by HPLC, the reaction solution is cooled in water, followed by addition of 150 parts of methanol to deposit crystal, and one hour later, the solution is filtered. The resulting matter is then rinsed in 200 parts of methanol and in water and is then dried, to obtain the Compound No.06 in red crystal at a yield of 28.8 parts.

Subsequently, 24.0 parts of 96% sulfuric acid is charged in a reactor, followed by addition of 39.6 parts of 30% fuming sulfuric acid thereto under cooling in ice, to prepare 12% fuming sulfuric acid. Under cooling in ice, then, 8.8 parts of the Compound No.06 are added thereto below 20° C., and then, sulfonation is promoted at a temperature of 40 to 45° C. for 5 hours. The resulting reaction solution is added to 400 parts of icy water, followed by addition of 80 parts of sodium chloride under agitation for salting, which is then agitated for 2 hours and is then filtered and dried, to obtain the sodium salt (composed of 9.1 parts of Compound No.36 and 3.2 parts of Compound No. 26) of the sulfonic acid derivative of the Compound No.06 in red powder at a yield of 12.3 parts. The λmax of the Compound is 532 nm (in an aqueous solution).

The sodium salt of the sulfonic acid derivative of the Compound No.06 thus obtained is dissolved in water, followed by addition of an acid to adjust the solution to acidity, to obtain a cake, which is then dissolved in water again, followed by addition of potassium hydroxide, lithium hydroxide, aqueous ammonia, diethanolamine or triethanolamine, to obtain the potassium salt, lithium salt, ammonium salt, diethanolamine salt or triethanolamine salt of the Compound No.06,resectively, instead of the sodium salt of the sulfonic acid derivative of the Compound No.06.

Example 8

24.6 parts of 1-amino-4-anilinoanthraquinone, 0.75 part of sodium carbonate, 36.0 parts of ethyl benzoylacetate and 75 parts of orthodichlorobenzene are charged in a reactor, which are then heated to 170 to 170° C. for 3-hr reaction. The reaction is promoted while purging generated ethanol and water from the reaction system. After the completion of the reaction is confirmed by HPLC, the reaction solution is cooled in water, followed by addition of 150 parts of methanol to deposit crystal, and one hour later, the solution is filtered. The resulting matter is then rinsed in 200 parts of methanol and in water and is then dried, to obtain the Compound in red crystal at a yield of 29.5 parts.

Subsequently, 26.0 parts of 96% sulfuric acid is charged in a reactor, followed by addition of 36.2 parts of 30% fuming sulfuric acid thereto under cooling in ice, to prepare 10% fuming sulfuric acid. Under cooling in ice, then, 9.1 parts of the Compound No.07 are added thereto below 20° C., and then, sulfonation is promoted at a temperature of 40 to 45° C. for 3 hours. The resulting reaction solution is added to 400 parts of icy water, followed by addition of 80 parts of sodium chloride under agitation for salting, and the resulting solution is agitated for 2 hours and is then filtered and dried, to obtain the sodium salt (composed of 12.2 parts of Compound No.37 and 2.7 parts of Compound No.27) of the sulfonic acid derivative of the Compound No.07 in red powder at a yield of 14.9 parts. The λmax of the sodium salt is 532 nm (in an aqueous solution).

The sodium salt of the inventive sulfonic acid derivative of the present invention thus obtained is dissolved in water, followed by addition of an acid to adjust the solution to acidity, to obtain a cake by filtration, which is then dissolved in water again, followed by addition of potassium hydroxide, lithium hydroxide, aqueous ammonia, diethanolamine or triethanolamine, to obtain the potassium salt, lithium salt, ammonium salt, diethanolamine salt or triethanolamine salt of the Compound No.07, respectively, instead of the sodium salt of the sulfonic acid derivative of the Compound No.07.

Example 9

25.7 parts of 1-methylamino-4-(3-methyl-anilino) anthraquinone, 0.75 part of sodium carbonate, 36.0 parts of ethyl benzoylacetate and 75 parts of orthodichlorobenzene are charged in a reactor, which are then heated to 170 to 170° C. for 4-hr reaction. The reaction is promoted while purging generated ethanol and water from the reaction system. After the completion of the reaction is confirmed by HPLC, the reaction solution is cooled in water, followed by addition of 150 parts of methanol to deposit crystal, and after 1-hour agitation, the solution is filtered. The resulting matter is then rinsed in 200 parts of methanol and in water and is then dried, to obtain the Compound No.08 in red crystal at a yield of 27.1 parts.

Subsequently, 31.0 parts of 96% sulfuric acid is charged in a reactor, followed by addition of 33.4 parts of 30% fuming sulfuric acid thereto under cooling in ice, to prepare 7% fuming sulfuric acid. Under cooling in ice, then, 9.4 parts of the Compound No.08 are added thereto below 20° C., and then, sulfonation is promoted at a temperature of 20 to 25° C. for 4 hours. The resulting reaction solution is added to 400 parts of icy water, followed by addition 100 parts of 25% caustic soda under agitation by dropwise, to adjust the solution to weak alkalinity, followed by addition of 80 parts of sodium chloride for salting, and after 2-hr agitation, the solution is filtered, and then, the resulting matter is dried to obtain the sodium salt of the Compound No.28 (the inventive dye) in red powder at a yield of 9.2 parts. The λmax of the sodium salt is 536 nm (in an aqueous solution).

The Compound No.28 thus obtained is dissolved in water, followed by addition of an acid to adjust the solution to acidity, to obtain a cake, which is then dissolved in water again, followed by addition of potassium hydroxide, lithium hydroxide, aqueous ammonia, diethanolamine or triethanolamine, to obtain the potassium salt, lithium salt, ammonium salt, diethanolamine salt or triethanolamine salt of the Compound No.28 respectively, instead of the sodium salt of the sulfonic acid derivative of the Compound No.28.

Example 10

(A) Ink preparation

By preparing a liquid of the following composition and filtering the liquid through a 0.45-μm membrane filter, the water-base ink composition of the present invention suitable for inkjet printing was obtained.

| Composition | |
|---|---|
| Sodium salt of the sulfonic acid derivative (No.21) of the Compound No.01 obtained in Example 1-1 (the sodium salt after desalting process) | 3.0 parts |
| Water | 77.5 parts |
| Ethylene glycol | 5.0 parts |
| Glycerin (non-drying oil) | 5.0 parts |
| Triethanolamine | 4.5 parts |
| 1,3-Dimethylimidazolidin-2-one | 5.0 parts |

(B) Inkjet print

By using an inkjet printer (Trade name; NOVAJET III manufactured by ENCAD CO.), inkjet recording was done on three types of paper, namely plain paper (Cannon Printer Paper A4 (TLC5A4S)), a specific paper A (Color BJ Paper LC1O1; manufactured by Cannon, Co.) and a specific paper B (coated paper STX73A4 for color image jet; manufactured by Sharp, Co.).

(C) Light-fastness test of recorded image

A carbon arc fade meter (manufactured by Suga Testing Machine Co.) was used to irradiate the recording papers for 20 hours.

Comparative Examples 1, 2 and 3

Three types of dyes for use as magenta for inkjet printing or proposed as such were tested as Comparative Examples.

(1) Comparative Example 1

According to Example 10 (A) and (B), an ink was prepared, except for the use of C.I. Acid Red 52 (rhodamine-type dye) instead of the dye of the present invention and was used for printing.

(2) Comparative Example 2

The description above in (1) was followed, except for the use of C.I. Direct Red 227 (azo-type dye) instead of the inventive dye.

(3) Comparative Example 3

The description above in (1) was followed, except for the use of C.I. Acid Red 82 (anthrapyridone-type dye) instead of the inventive dye.

The results of assessment are shown in Table 4.

TABLE 4

| | | Light-fastness | | |
|---|---|---|---|---|
| | Vividness (C*) | plain paper | specific paper A | specific paper B |
| Example 10 | 67.6 | grade 4 | grade 3 | grade 4 |
| Comparative Example 1 | 83.4 | grade 1 | grade 1 | grade 1 |
| Comparative Example 2 | 54.0 | grade 2 | grade 1 | grade 2 |
| Comparative Example 3 | 64.8 | grade 4 | grade 3 | grade 4 |

$C^* = ((a^*)^2 + (b^*)^2)^{1/2}$

Table 4 indicates that on comparison between the ink composition of Example 10 of the present invention and the conventional anthrapyridone-type dye (Comparative Example 3), the two are at almost the same level in terms of light-fastness but the compound of the present invention is better in vividness.

With respect to the magenta dyes, the compositions of Example 10 of the present invention or the composition of Comparative Example 3 was mixed with a common yellow ink or a common cyan ink to prepare blend colors (red, blue), respectively. The resulting colors were assayed by colorimetry to determine the value $L^*a^*b^*$. For simple reference, the same calorimetric assay was conducted about yellow, cyan and a blend color (green). The results are shown in Table 5. Herein, the yellow ink and the cyan ink used were preliminarily produced according to Example 10(A). The following dyes were used.

Yellow ink: C. I. Direct Yellow 86

Cyan ink: C. I. Direct Blue 199

Green ink: a green ink was prepared by mixing together the yellow ink and the cyan ink.

TABLE 5

| | | Red | Magenta | Blue | Yellow | Cyan | Green |
|---|---|---|---|---|---|---|---|
| Value L* | Example 10 | 48.5 | 45.5 | 27 | 81 | 47 | 39.5 |
| | Comparative Example 3 | 51.5 | 50 | 29 | | | |
| Value a* | Example 10 | 55 | 67 | 20 | 11 | −14.5 | −40 |
| | Comparative Example 3 | 57 | 64 | 16.5 | | | |
| Value b* | Example 10 | 37 | −7 | −41 | 86 | −48.5 | 7.5 |
| | Comparative Example 3 | 37 | 7 | −31 | | | |

Table 5 indicates that the magenta of the present invention has a value b* of -7, closer by 14 toward the— direction than the magenta of the Comparative Example, which is a nearly ideal magenta color with an appropriate bluish tone. Additionally, the value b* of blue as a blend color thereof with cyan is −41, which is more strongly bluish. When the values of a* and b* in Table 5 are plotted on a chromaticity diagram, the magenta of the present invention has more diversified values of a* and b* in the regions + and −, respectively, than the values of a* and b* of the magenta of the Comparative Example, which indicates that the magenta of the present invention can exert more color tones in these regions. More specifically, the results suggest that the ink of Example 10 of the present invention has an apparently enlarged range of colors and is excellent in terms of B (blue color) and M (magenta color), in particular (see attached FIG. 1).

Example 11

The same manner as in Example 10 was repeated, except for the use of the compound No.22 obtained in Example 2 (which was desalted) instead of the compound No.21 of Example 10 in the preparation of an ink.

The results of assessment are shown in Table 6.

TABLE 6

|  | Vividness (C*) | Light-fastness | | |
|---|---|---|---|---|
|  |  | plain paper | specific paper A | specific paper B |
| Example 11 | 67.4 | grade 4 | grade 3 | grade 4 |
| Comparative Example 1 | 83.4 | grade 1 | grade 1 | grade 1 |
| Comparative Example 2 | 54.0 | grade 2 | grade 1 | grade 2 |
| Comparative Example 3 | 64.8 | grade 4 | grade 3 | grade 4 |

$C^* = ((a^*)2 + (b^*)2)^{1/2}$

Table 6 indicates that on comparison between the ink composition of example 11 of the present invention and the conventional anthrapyridone-type dye (Comparative Example 3), the two are at almost the same level in terms of light-fastness but the compound of the present invention is better in terms of vividness.

With respect to the magenta dyes, the composition of Example 11 or the composition of Comparative Example 3 was mixed with a common yellow ink or a common cyan ink, respectively, to prepare blend colors (red, blue), the resulting colors were assayed by colorimetry to determine the value L*a*b*. For simple reference, the same calorimetric assay was conducted about yellow, cyan and a blend color (green). The results are shown in Table 7. Herein, the yellow ink and the cyan ink used were preliminarily produced according to Example 10(A). The following dyes were used.

Yellow ink: C. I. Direct Yellow 86
Cyan ink: C. I. Direct Blue 199
Green ink: a green ink was prepared by mixing together the yellow ink and the cyan ink.

TABLE 7

|  |  | Red | Magenta | Blue | Yellow | Cyan | Green |
|---|---|---|---|---|---|---|---|
| Value L* | Example 10 | 47.3 | 44.4 | 28 | 81 | 47 | 39.5 |
|  | Comparative Example 3 | 51.5 | 50 | 29 |  |  |  |
| Value a* | Example 11 | 53 | 66 | 20 | 11 | −14.5 | −40 |
|  | Comparative Example 3 | 57 | 64 | 16.5 |  |  |  |
| Value b* | Example 11 | 34 | −14 | −43 | 86 | −48.5 | 7.5 |
|  | Comparative Example 3 | 37 | 7 | −31 |  |  |  |

Table 7 indicates that the magenta of the present invention has a value b* of −14, closer by 21 toward the Table 5 indicates that the magenta of the present invention has a value b* of −7, closer by 14 toward the — direction than the magenta of the Comparative Example, which is a nearly ideal magenta color with an appropriate bluish tone. Additionally, the value b* of blue as a blend color thereof with cyan is −41, which is more strongly bluish. When the values of a* and b* in Table 5 are plotted on a chromaticity diagram, the magenta of the present invention has more diversified values of a* and b* in the regions + and −, respectively, than the values of a* and b* of the magenta of direction than the magenta of the Comparative Example, which is a nearly ideal magenta color with an appropriate bluish tone. Additionally, the value b* of blue as a blend color thereof with cyan is −43, which is more strongly bluish. When the values of a* and b* in Table 7 are plotted on a chromaticity diagram, the magenta of the present invention has more diversified values of a* and b* in the regions + and −, respectively, than the values of a* and b* of the magenta of the Comparative Example, which indicates that the magenta of the present invention can exert more color tones in these regions. In other words, the results suggest that the ink of example 11 of the present invention has an apparently enlarged range of colors and is excellent in terms of B (blue color) and M (magenta color), in particular (see attached FIG. 2).

INDUSTRIAL APPLICABILITY

The compound of the present invention is a dye in a magenta color with an appropriate bluish tone and has excellent light-fastness, and using the compound in combination with other yellow and cyan inks, color tones in an enlarged visible range can be prepared. This is highly valuable as a coloring matter for obtaining a recording ink composition for inkjet recording and writing materials.

What is claimed is:

1. An anthrapyridone compound represented by the formula (II):

(II)

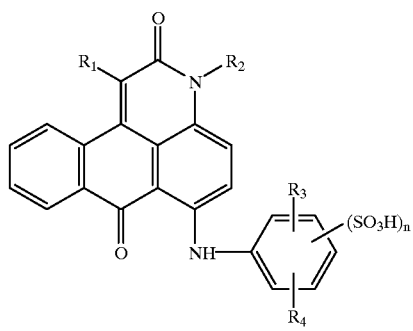

wherein $R_1$ represents methoxycarbonyl group, ethoxycarbonyl group, carboxyl group, benzoyl group or 3-sulfobenzoyl group; $R_2$ represents hydrogen atom or methyl group; $R_3$ and $R_4$ independently represent hydrogen atom, chlorine atom, methyl group or methoxy group; n represents 2 or a salt thereof.

2. An anthrapyridone compound or a salt thereof according to claim 1, wherein $R_1$ represents alkoxycarbonyl group, carboxyl group, benzoyl group or 3-sulfobenzoyl group; $R_2$ represents hydrogen atom or methyl group; $R_3$ represents hydrogen atom, methyl group or chlorine atom bound to position 3 and $R_4$ represents hydrogen atom; n represents an integer 1 or 2 and sulfonate group is bound at position 4 or sulfonate groups are bound at positions 4 and 6.

3. An anthrapyridone compound or a salt thereof according to claim 1, wherein $R_1$ represents alkoxycarbonyl group; n is 2; and sulfonate groups are bound at positions 4 and 6.

4. An anthrapyridone compound or a salt thereof according to claim 1, wherein $R_1$ represents alkoxycarbonyl group; $R_2$ represents hydrogen atom or methyl group; $R_3$ represents hydrogen atom or methyl group bound at position 3; and $R_4$ represents hydrogen atom; n is 2; and sulfonate groups are bound at positions 4 and 6.

5. A compound represented by the formula (III);

(III)

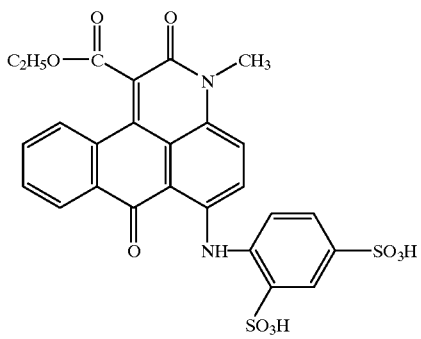

or a salt thereof.

6. A compound represented by the formula (IV);

(IV)

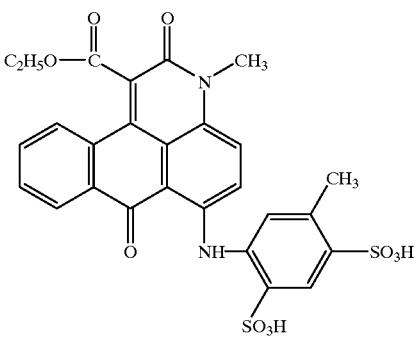

or a salt thereof.

7. An anthrapyridone compound represented by the formula (V);

(V)

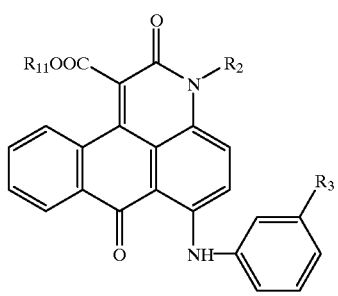

wherein $R_{11}$ represents alkyl group; $R_2$ represents hydrogen atom or alkyl group; $R_3$ represents hydrogen atom, halogen atom, alkyl group or alkoxyl group, except for the case that $R_2$ is methyl group and $R_3$ is hydrogen atom provided that $R_{11}$ is methyl group and the case that $R_2$ is 2-ethylhexyl group and $R_3$ is hydrogen atom provided that $R_{11}$ is ethyl group, or a salt thereof.

8. A water-base ink composition containing an anthrapyridone compound or a salt thereof, according to any one of claims 1 to 7.

9. Colored papers having been colored with an anthrapyridone compound or a salt thereof, according to any one of claims 1 to 7.

10. Colored fiber and cloth having been colored by a printer with an anthrapyridone compound or a salt thereof according to any one of claims 1–7.

* * * * *